United States Patent
Lee et al.

(10) Patent No.: US 10,664,069 B1
(45) Date of Patent: May 26, 2020

(54) STYLUS WITH INPUT ADAPTER

(71) Applicant: Apple Inc., Cupertino, CA (US)

(72) Inventors: Jae Hwang Lee, San Jose, CA (US);
Frank Angermann, Dresden (DE);
Killian J. Poore, Santa Clara, CA (US);
David M. Schattel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 15/831,288

(22) Filed: Dec. 4, 2017

Related U.S. Application Data (60) Provisional application No. 62/552,278, filed on Aug. 30, 2017.

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
None
See application file for complete search history.

(56) References Cited

U.S. PATENT DOCUMENTS

| | | | |
|---|---|---|---|
| 5,004,871 A * | 4/1991 | Purcell | G06F 3/03545 178/19.04 |
| 5,061,828 A * | 10/1991 | Purcell | G06F 3/03545 178/19.04 |
| 8,576,222 B2 | 11/2013 | Handley et al. | |
| 9,213,424 B1 * | 12/2015 | Dunn | G06F 3/03545 |
| 9,575,573 B2 | 2/2017 | Chang | |
| 9,582,093 B2 | 2/2017 | Vandermeijden et al. | |
| 2007/0085836 A1 * | 4/2007 | Ely | G06F 3/03545 345/173 |
| 2014/0267180 A1 * | 9/2014 | Buelow | G06F 3/03545 345/179 |
| 2014/0317575 A1 | 10/2014 | Ullmann et al. | |
| 2015/0324018 A1 * | 11/2015 | Hinson | G06F 3/03545 345/179 |
| 2015/0331506 A1 * | 11/2015 | Vandermeijden | G06F 3/041 345/179 |
| 2016/0109967 A1 * | 4/2016 | Craig | G06F 3/03545 345/179 |
| 2016/0282964 A9 | 9/2016 | Kim et al. | |
| 2017/0228053 A1 * | 8/2017 | Short | G06F 3/038 |

* cited by examiner

*Primary Examiner* — Christopher R Lamb
(74) *Attorney, Agent, or Firm* — Morgan, Lewis & Bockius LLP (57) ABSTRACT

An input device, such as a hand-held stylus, can be used to receive inputs and track motion of a user in three-dimensional space, for example during a drawings session. The tip sensor can detect contact with an object by receiving a force toward a body of the stylus. Inputs from the user can be applied to a tip sensor of the stylus via an adapter. The inputs provided via the adapter can be different from inputs applied by contact with an object. Accordingly, the stylus can interpret the user inputs to initiate, terminate, or modify characteristics of the drawing session.

18 Claims, 10 Drawing Sheets

STYLUS WITH INPUT ADAPTER

CROSS-REFERENCE TO RELATED APPLICATION

This application claims the benefit of U.S. Provisional Application No. 62/552,278, entitled "STYLUS WITH INPUT ADAPTER," filed Aug. 30, 2017, the entirety of which is incorporated herein by reference.

FIELD

The described embodiments relate generally to styluses. More particularly, the present embodiments relate to styluses having adapters to receive input from a user.

BACKGROUND

A variety of handheld input devices exist for detecting input from a user during use. For example, a stylus can be utilized to provide input by contacting a surface, such as a touch panel. The touch panel may include a touch sensitive surface that, in response to detecting a touch event, generates a signal that can be processed and utilized by other components of the electronic device. The stylus can include a sensor, such as at a tip of the stylus, to detect input based on user activity. Typically, a user can move one or more input devices, such as a stylus, across a surface in a pattern that the device translates into an input command.

BRIEF DESCRIPTION OF THE DRAWINGS

Certain features of the present disclosure are set forth in the appended claims. However, for purpose of explanation, several embodiments of the present disclosure are set forth in the following figures.

DETAILED DESCRIPTION

The detailed description set forth below is intended as a description of various configurations of the present disclosure and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

An electronic device, such as a stylus, can include a tip sensor that detects when a tip probe of the stylus is in contact with a surface of an object. The object can include a touch panel of another device or any other tangible surface. The tip sensor can detect a force that is applied to a tip probe of the stylus when brought into contact with the surface. The stylus can be provided in a compact form to allow easy handling by a user. The same stylus can also be used for other general purposes, such as providing input to an external device with a touchscreen.

According to some embodiments of the present disclosure, inputs can also be detected without contacting a tip probe of the stylus to a surface of a tangible object. For example, the stylus can be provided with an adapter that converts a user input to the tip sensor, so that the inputs can be detected while moving the stylus in open space. As such, the adapter can allow a user to operate the stylus and its existing components to perform new functions. For example, the adapter can allow a user to use the stylus in three-dimensional space without relying on object surfaces to provide inputs. Additionally or alternatively, the adapter can be used while contacting the stylus to a surface to provide a combined input.

Figure 1:
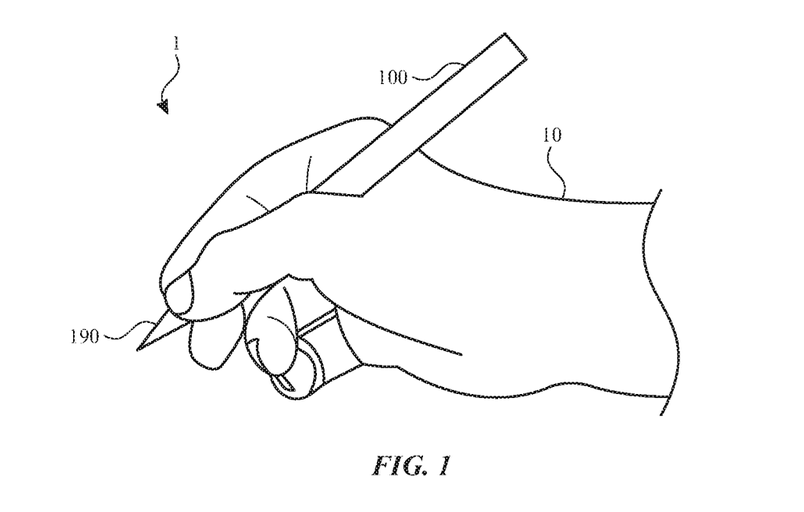
FIG. 1 illustrates a view of a stylus in use by a user, according to some embodiments of the present disclosure.
Figure 2:
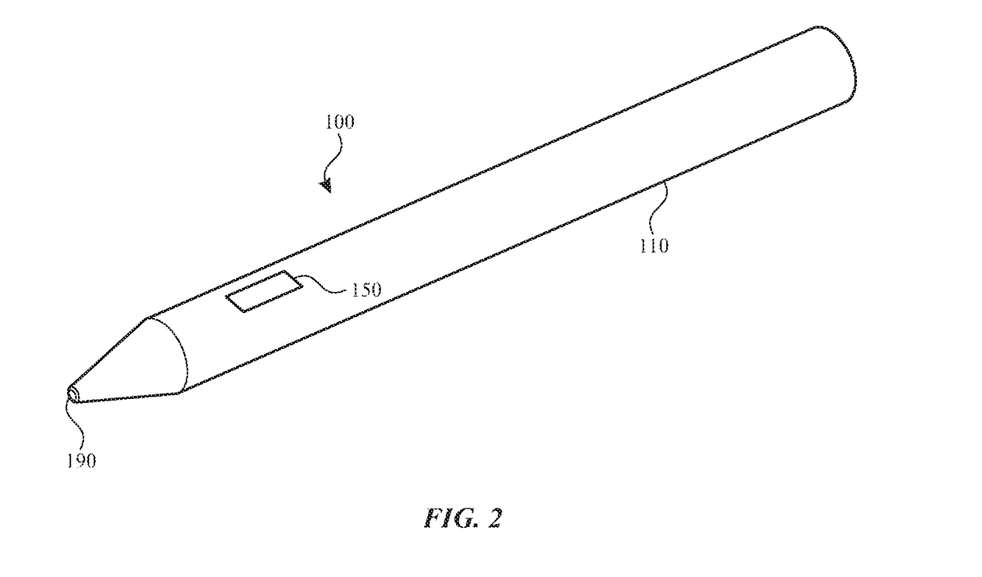
FIG. 2 illustrates a perspective view of the stylus of FIG. 1, according to some embodiments of the present disclosure.

FIGS. 1 and 2 illustrate a stylus 100, according to some embodiments of the present disclosure. The stylus 100 can be held by a user 10 during operation. The stylus 100 can be used to receive inputs from a user while moving freely within three-dimensional space. The stylus 100 can be used alone or in conjunction with another device.

The stylus 100 detects when a portion thereof is contacting an object. FIG. 2 illustrates the stylus 100, according to some embodiments of the present disclosure. According to some embodiments, a tip probe 190 of the stylus 100 includes one or more tip sensors that detect when the tip probe 190 contacts a surface of an object. The stylus 100 records or wirelessly transmits a signal when contact with the tip probe 190 is detected. The stylus 100 can also include a button 150 for receiving input from a user, as described further herein.

In use, the stylus 100 can receive and detect inputs from a user. The input can be provided without requiring that the tip probe 190 contact a surface of an object. For example, the user can provide a detectable input by applying a force to an input device of the stylus 100. The input device can be a portion of the stylus 100 or an item that is removably connected to the stylus 100. For example, the input device can be the button 150 or an adapter 200 that is removably connected to the tip probe 190, as discussed further herein.

Figure 3:
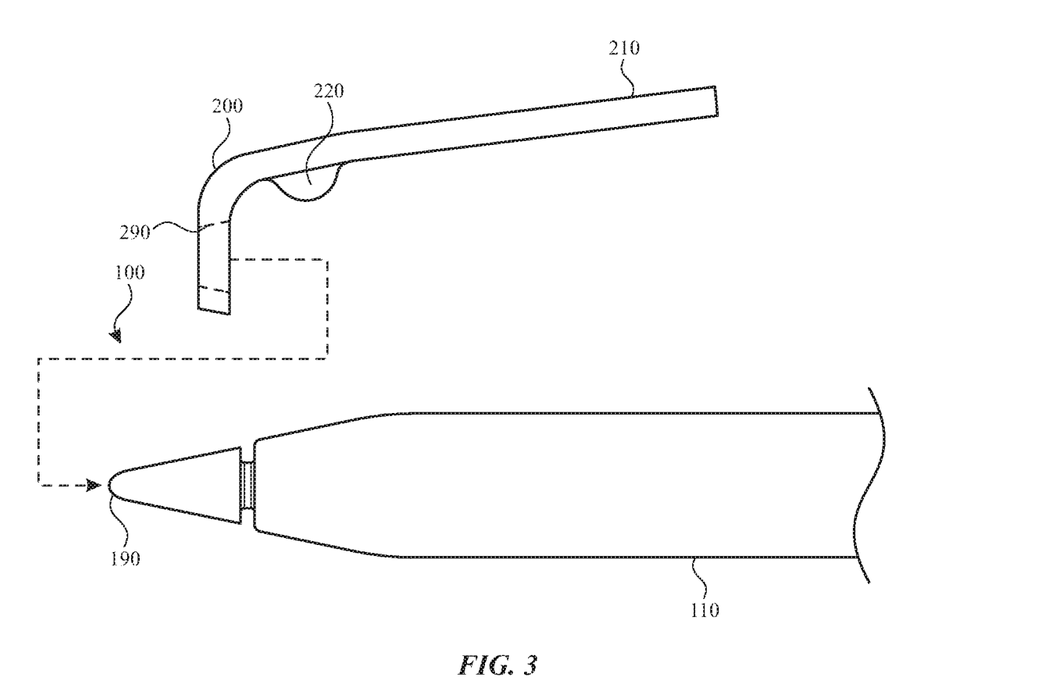
FIG. 3 illustrates a side view of a stylus and an adapter, according to some embodiments of the present disclosure.
Figure 4:
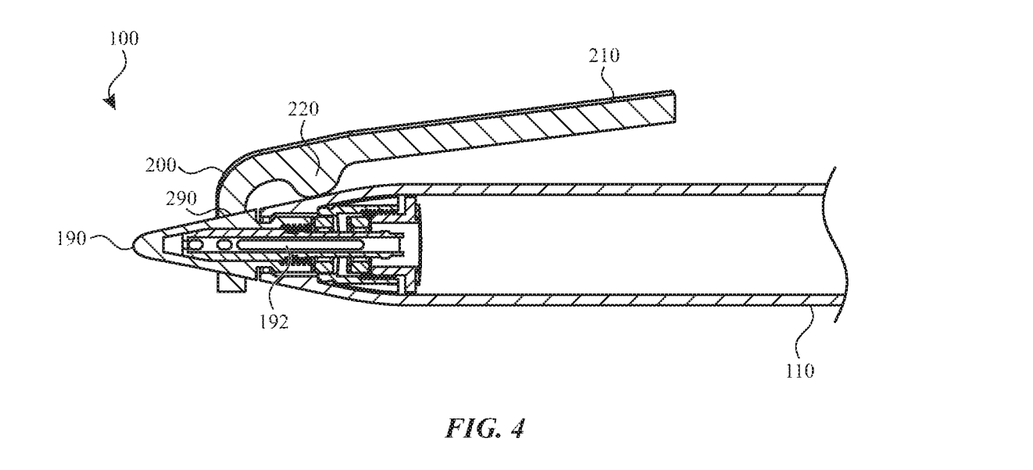
FIG. 4 illustrates a sectional view of the stylus and adapter of FIG. 3, according to some embodiments of the present disclosure.

According to some embodiments, as shown in FIGS. 3 and 4, an adapter 200 can be provided for inducing a force at the tip probe 190. In some embodiments, the adapter 200 is an input device for receiving an input (e.g., force) from a user. The adapter 200 can be removably attached to the tip probe 190 of the stylus 100. For example, the adapter 200 includes an engagement end portion 290 that is configured to engage the tip probe 190. The engagement end portion 290 can have a structure that accommodates the tip probe 190 so that the tip probe 190 need not have any features specifically designed for engagement with the adapter 200. The adapter 200 can be attached to or removed from the tip probe 190 as desired by a user. In the absence of the adapter 200, the stylus 100 can still operate by contacting the tip probe 190 against a surface of an object. For example, prior to using the stylus 100 against a surface, the adapter 200 can be removed. By further example, prior to using the stylus 100 in open space, the adapter 200 can be attached. It will be also recognized that the adapter 200 can be attached and manipulated while the stylus 100 is used against a surface.

The stylus 100 includes a tip sensor 192 for sensing inputs at the tip probe 190. One or more tip sensors 192 can include one or more contact sensors, capacitive sensors, touch sensors, cameras, piezoelectric sensors, pressure sensors, photodiodes, and/or other sensors operable to detect contact with an object. The tip sensor 192 can include a capability to sense a surface, such as by forces with a force sensor. The tip sensor 192 can include a capability to sense input provided via the adapter 200. The tip sensor 192 can be configured to sense forces, or components of forces, along a single axis, such as a longitudinal axis of the stylus 100. The tip sensor 192 can be configured to sense forces in opposite directions along a given axis. For example, the tip sensor 192 can interpret a force in a first direction as a positive force and a force in a second direction, opposite the first direction, as a negative force. Additionally or alternatively, the tip sensor 192 can be configured to sense forces in multiple axes.

As shown in FIGS. 3 and 4, the adapter 200 includes an input end portion 210 for receiving an input from a user gripping the stylus 100. The adapter 200 further includes a fulcrum 220 for contacting a body 110 of the stylus 100. The fulcrum 220 is positioned between the input end portion 210 and the engagement end portion 290. The adapter 200 can act as a lever device, wherein the fulcrum 220 assists in conversion of inputs at the input end portion 210 into forces applied to the tip probe 190 with the engagement end portion 290.

Figure 5:
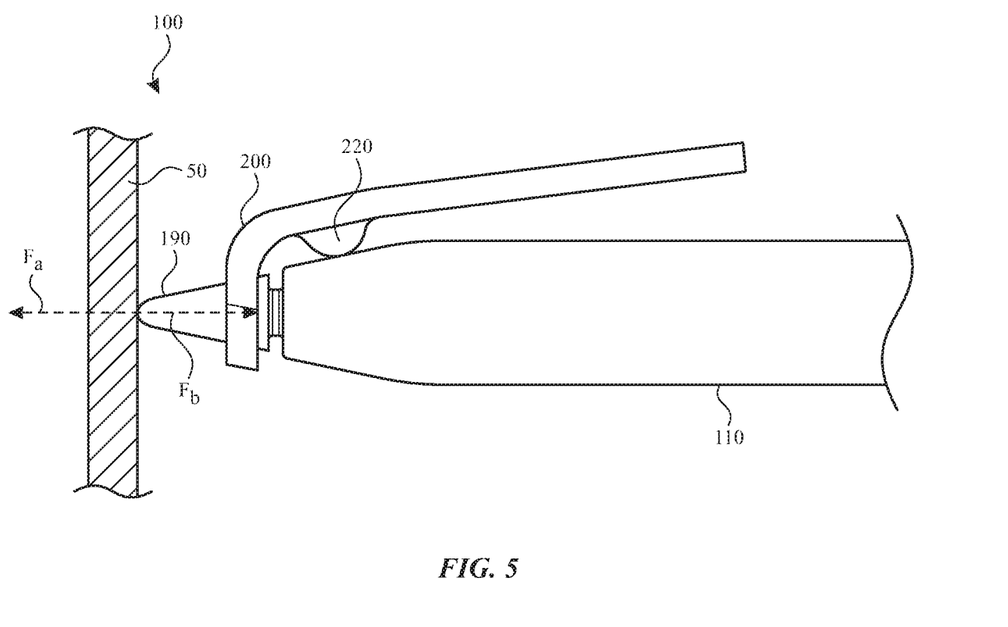
FIG. 5 illustrates a side view of the stylus and adapter of FIG. 3, according to some embodiments of the present disclosure.

As shown in FIG. 5, the stylus 100 can be applied to a surface 50 with a force $F_a$. In response, the surface 50 applies a force $F_b$ against the tip probe 190. The force $F_b$ is detected by the tip sensor 192 of the tip probe 190. The force $F_b$, or a component thereof, is applied along a longitudinal axis of the stylus 100. Specifically, the force $F_b$, or a component thereof, is directed toward the body 110 of the stylus 100. The stylus 100 can interpret and record the force $F_b$ as an occurrence of contact with a tangible object. For example, a corresponding time, position, and/or magnitude relating to the detection of the force $F_b$ can be recorded and/or transmitted by the stylus 100.

Figure 6:
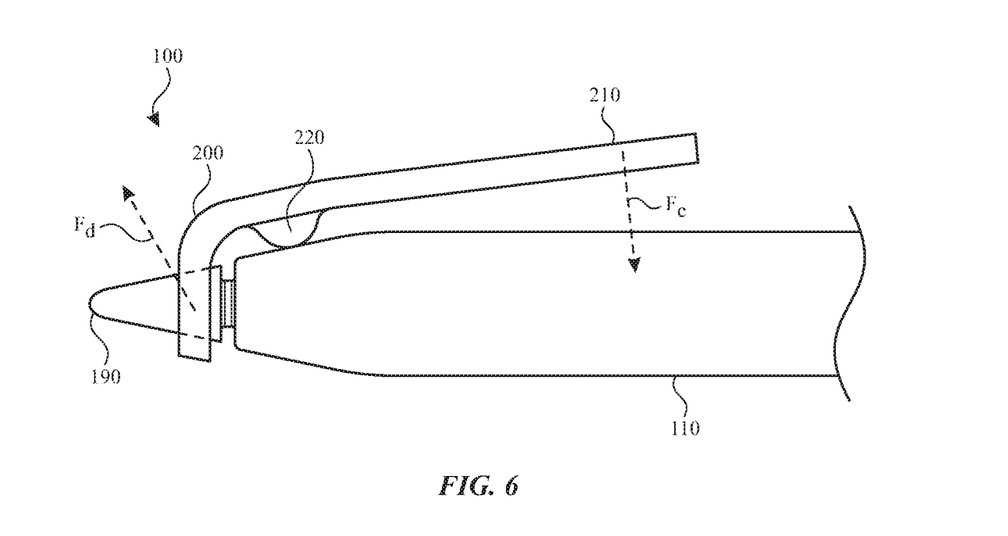
FIG. 6 illustrates a side view of the stylus and adapter of FIG. 3, according to some embodiments of the present disclosure.

As shown in FIG. 6, the stylus 100 can receive inputs without contacting a surface. During use, an input force $F_c$ can be applied to the input end portion 210 of the adapter 200. The input force $F_c$, or a component thereof, can be transverse to the longitudinal axis of the stylus 100. The input force $F_c$ can urge the fulcrum 220 against the body 110 of the stylus 100. The adapter 200, the of the fulcrum 220, can convert the input force $F_c$ to an output force $F_d$ applied to the tip probe 190. The output force $F_d$ is detected by the tip sensor 192 of the tip probe 190. The output force $F_d$, or a component thereof, is applied along a longitudinal axis of the stylus 100. Specifically, the output force $F_d$, or a component thereof, is directed away from the body 110 of the stylus 100. The stylus 100 can interpret and record the output force $F_d$ as an input without a corresponding contact with a tangible object. For example, a corresponding time, position, and/or magnitude relating to the detection of the output force $F_d$ can be recorded and/or transmitted by the stylus 100.

Figure 7:
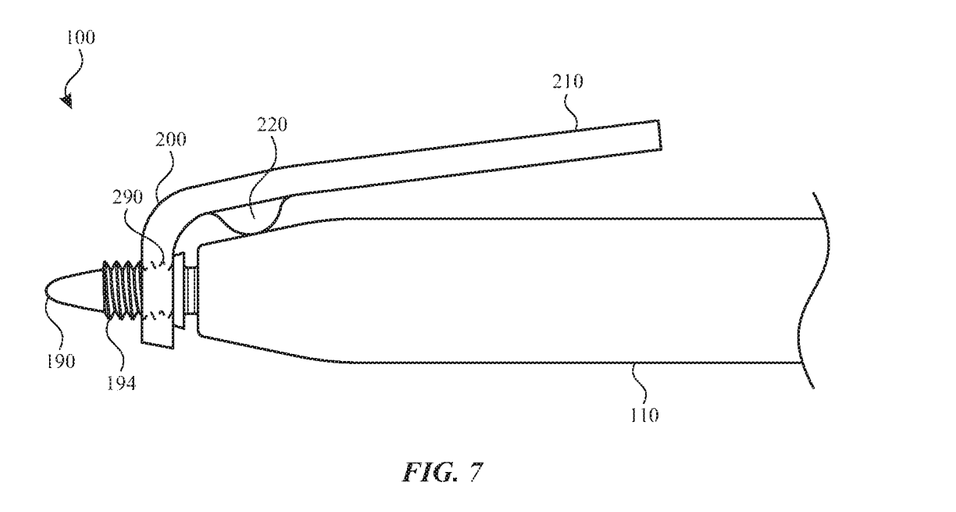
FIG. 7 illustrates a side view of a stylus with an adapter, according to some embodiments of the present disclosure.
Figure 8:
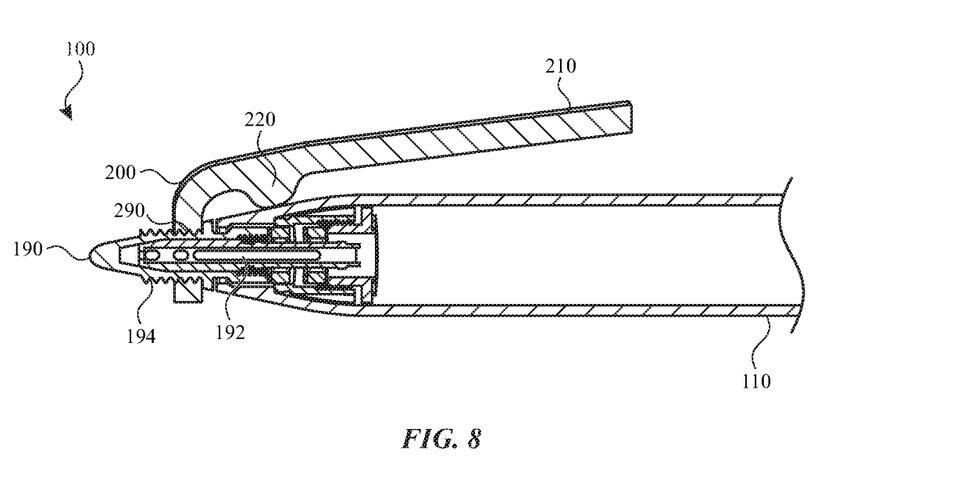
FIG. 8 illustrates a sectional view of the stylus and adapter of FIG. 7, according to some embodiments of the present disclosure.

The adapter 200 can be provided with features that enhance engagement with the tip probe 190. According to some embodiments, as shown in FIGS. 7 and 8, the engagement end portion 290 of the adapter 200 is configured to securely engage the tip probe 190. For example, the engagement end portion 290 can include threads that engage threads 194 of the tip probe 190. Other mechanisms for removably engaging the tip probe 190 with the adapter 200 are contemplated, such as clips, snaps, detents, grooves, ridges, and elastically deformable materials. The adapter 200 can be attached to and removed from the tip probe 190 as desired by a user. In the absence of the adapter 200, the stylus 100 can still operate by contacting the tip probe 190 against a surface of an object.

Figure 9:
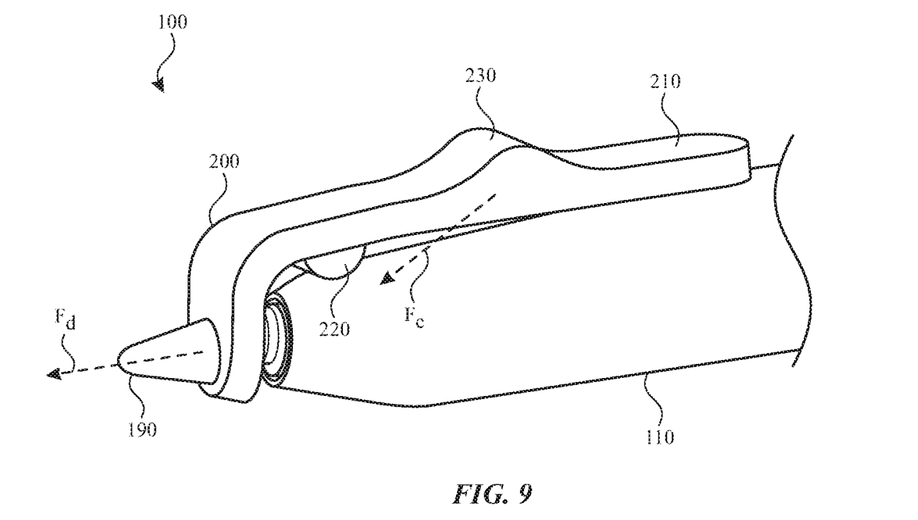
FIG. 9 illustrates a perspective view of a stylus with an adapter, according to some embodiments of the present disclosure.

The adapter 200 can be provided with features that enhance transmission of forces to the tip probe 190. According to some embodiments, as shown in FIG. 9, an outer surface of the input end portion 210 can include a protrusion 230 that extends outwardly away from the body 110. The protrusion 230 allows a user to apply a force to the tip probe 190 that is more axially directed and away from the body 110 of the stylus 100. A more axially directed force will be more readily detectable by a tip sensor 192 that senses generally axial forces. By directing the force to be more axial, the magnitude of the detected force is increased, which allows the tip sensor 192 to be more responsive. For example, the protrusion 230 can provide a rearward-facing side that allows a user to apply an input force $F_c$ with an axial component in a direction of the tip probe 190. The corresponding output force $F_d$ applied to the tip probe 190 then has an axial component that is greater than an axial component of a force applied to the input end portion 210 and transverse to the longitudinal axis of the stylus 100. The relatively larger axial component of the output force $F_d$ can be achieved with the same effort from the user thereby allowing a greater range of detectable magnitudes for the output force $F_d$. Accordingly, the tip sensor 192 can be more sensitive to user input with use of the protrusion 230 on the adapter 200.

Figure 10:
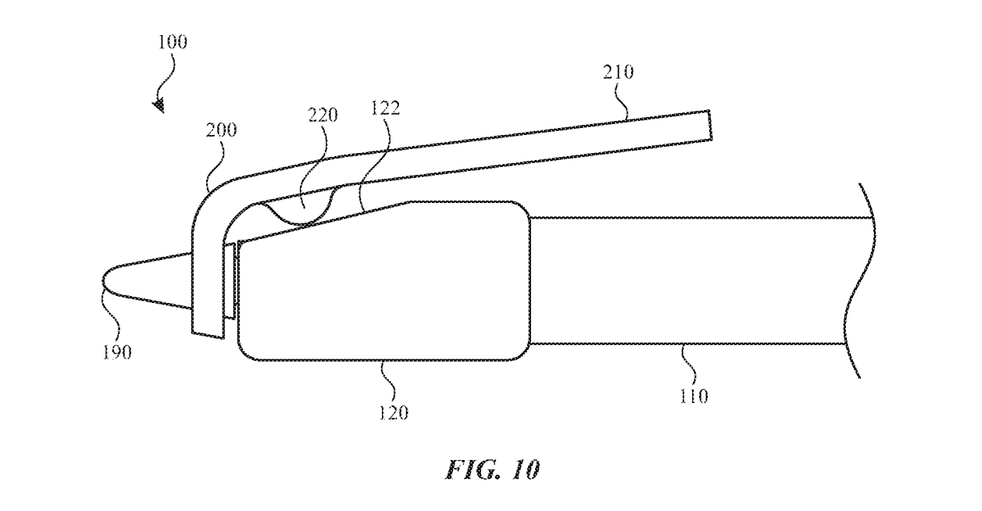
FIG. 10 illustrates a side view of a stylus with an adapter, according to some embodiments of the present disclosure.

The adapter 200 can interact with components of the stylus 100 that accommodate the adapter 200. According to some embodiments, as shown in FIG. 10, a grip 120 can be provided on or integral with the body 110 of the stylus 100. The grip 120 can include a surface 122 upon which the fulcrum 220 of the adapter 200 can rest. The surface 122 can be planar, concave, or convex. The grip 120 can provide an outer cross-sectional dimension that is larger than an outer cross-sectional dimension of the body 110 of the stylus 100. The surface 122 can be along a region of the grip 120 that has a smaller cross-sectional dimension than other regions of the grip 120. The grip 120 can be fixedly or removably attached to the body 110.

Figure 11:
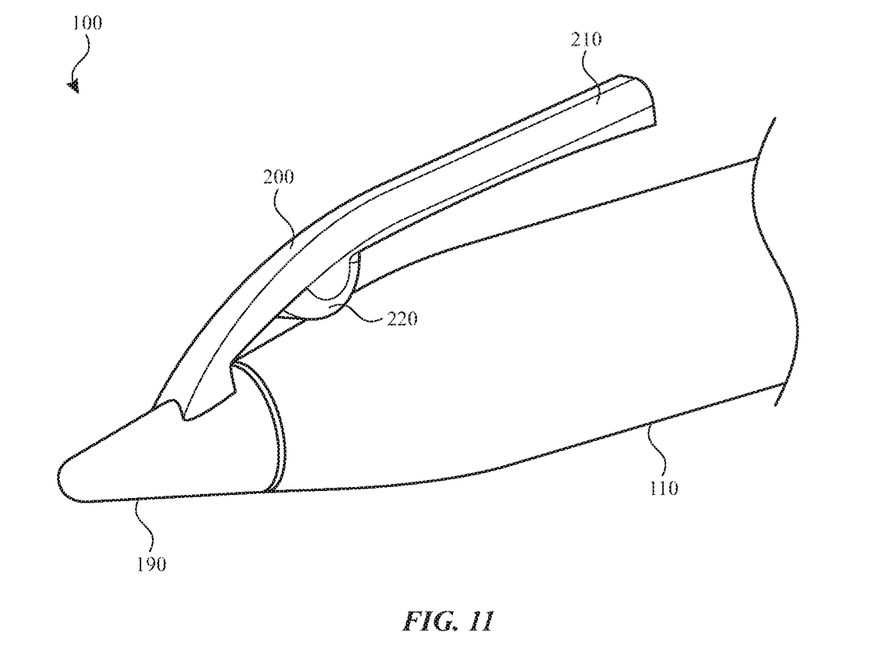
FIG. 11 illustrates a perspective view of a stylus with an adapter, according to some embodiments of the present disclosure.

The adapter 200 can be integral with the tip probe 190. According to some embodiments, as shown in FIG. 11, the adapter 200 extends from a portion of the tip probe 190. As described herein, the adapter 200 includes the fulcrum 220 and the input end portion 210, extending rearwardly away from the tip probe 190. The adapter 200 and the tip probe 190 can form portions of a unibody structure that is formed (e.g., co-molded) in a single stage. Additionally or alternatively, the adapter 200 and the tip probe 190 can be separately formed and joined together.

Figure 12:
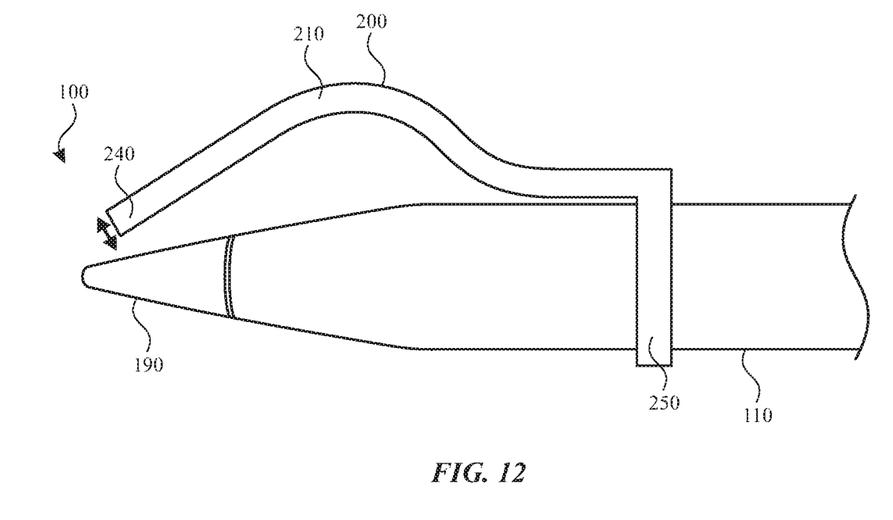
FIG. 12 illustrates a side view of a stylus with an adapter, according to some embodiments of the present disclosure.

The adapter 200 can extend from the body 110 of the stylus 100 toward the tip probe 190. According to some embodiments, as shown in FIG. 12, the adapter 200 extends from a portion of the body 110, where it is fixedly or removably attached thereto with a connector 250. The input end portion 210 can be located at one end of the adapter 200. A tip actuator portion 240 can be located at an end of the adapter 200 that is opposite the input end portion 210. When a force is applied to the input end portion 210, the adapter 200 can flex, bend, and/or rotate to bring the tip actuator portion 240 into contact with the tip probe 190 and apply a force thereto. The adapter 200 shown in FIG. 12 can operate without a fulcrum between the input end portion 210 and the tip actuator portion 240.

Figure 13:
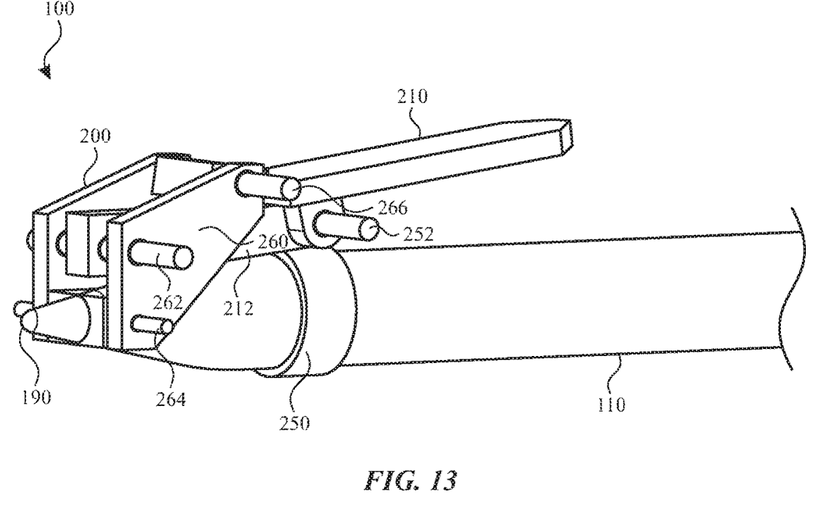
FIG. 13 illustrates a perspective view of a stylus with an adapter, according to some embodiments of the present disclosure.
Figure 14:
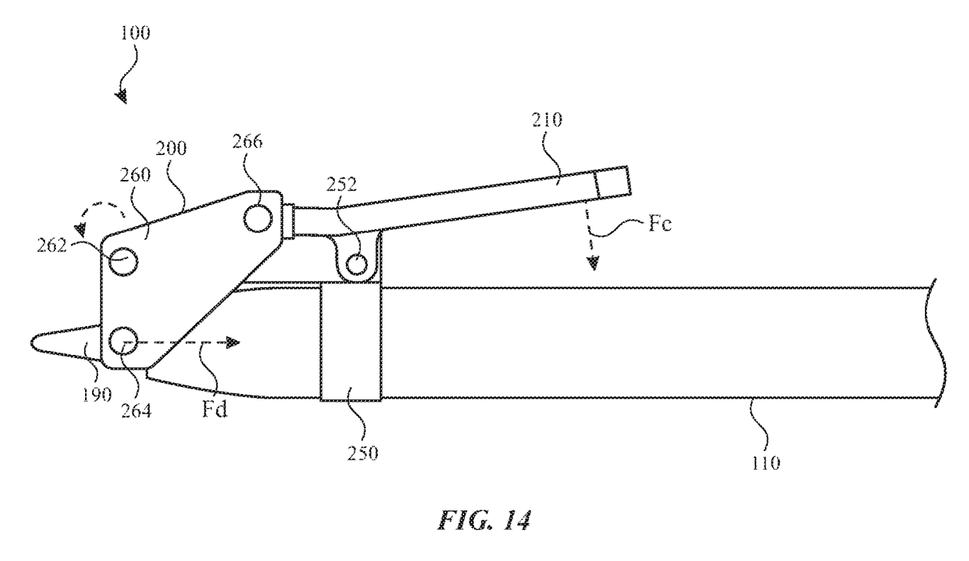
FIG. 14 illustrates a side view of the stylus and adapter of FIG. 13, according to some embodiments of the present disclosure.

The adapter 200 can include multiple parts that operate in concert to apply to the tip probe 190 a force that is largely or entirely axial in direction. According to some embodiments, as shown in FIGS. 13 and 14, the adapter includes at least two rotatable portions coupled together to transmit a force to the tip probe 190. An extension arm 212 of a primary lever can be fixedly or removably attached to the body 110 of the stylus 100 with a connector 250. The extension arm 212 supports one or both of the two rotatable portions coupled together. For example, the input end portion 210 is coupled to the extension arm 212 and rotates about a first pin 252. The first pin 252 rotatably couples the input end portion 210 to the extension arm 212. As such, the first pin 252 provides a pivot or fulcrum for rotation of the input end portion 210. The input end portion 210 is coupled to an intermediate lever 260. The intermediate lever 260 is coupled to the extension arm 212 and rotates about a second pin 262. The second pin 262 rotatably couples the intermediate lever 260 to the extension arm 212. As such, the second pin 262 provides a pivot or fulcrum for rotation of the intermediate lever 260. The primary lever is coupled to the intermediate lever 260 via a first hinge 266, which allows forces to be transmitted from the primary lever to the intermediate lever 260 while allowing relative rotation of the primary lever and the intermediate lever 260. The intermediate lever 260 is coupled to the tip probe 190 via a second hinge 264, which allows forces to be transmitted from the intermediate lever 260 to the tip probe 190 while allowing relative rotation of the intermediate lever 260 and the tip probe 190.

The multiple levers of the adapter 200 convert a force that is transverse to the longitudinal axis of the stylus 100 to a force that is substantially parallel to the longitudinal axis of the stylus 100. When an input force $F_c$ is applied to the input end portion 210 of the first lever, the first lever rotates about the first pin 252 and transmits a force to the intermediate lever 260 via the first hinge 266. In response, the intermediate lever 260 rotates about the second pin 262 and transmits an output force $F_d$ to the tip probe via the second hinge 264. Where a vector passing through the second pin 262 and the second hinge 264 is substantially perpendicular to the longitudinal axis of the stylus 100, the output force $F_d$ transmitted to the tip probe 190 is substantially parallel to the longitudinal axis of the stylus 100. Accordingly, where the tip sensor 192 measures forces parallel to the longitudinal axis of the stylus 100, all or substantially all of the output force $F_d$ will be detectable by the tip sensor 192. Accordingly, an output force $F_d$ detected by the tip sensor 192 is more representative of the input force $F_c$ applied to the input end portion 210 than it would be if only a component of the total output force $F_d$ were detectable by the tip sensor 192.

While the output force $F_d$ in FIG. 14 is shown in a direction toward the body 110, it will be understood that the adapter 200 can be arranged to provide an output force $F_d$ that is away from the body 110 when the input force $F_c$ is applied. For example, the first pin 252 and the second pin 262 can be arranged so that application of the input force $F_c$ either pushes the tip probe 190 toward the body 110 or pulls the tip probe 190 away from the body 110. Accordingly, the resulting rotation of the intermediate lever 260 can allow the second hinge 264 and the tip probe 190 to move toward or away from the body 110. The tip sensor 192 or corresponding electronics can interpret the output force $F_d$ accordingly as an input provided as an input force $F_c$ applied to the input end portion 210 of the first lever.

Components of the stylus 100 can be configured to receive input directly from the user to indicate when position measurements are to be taken. For example, the stylus 100 can include an input device, such as a button 150, set within the body 110. In some embodiments, the button 150 is an input device for receiving an input (e.g., force) from a user. The button 150 can include a switch, knob, lever, force sensor, and/or another input device. Any number of buttons 150 can be provided for receiving user input. The user can operate the button 150 to initiate a usage session, terminate a usage session, or command the stylus 100 to perform other functions, as discussed further herein.

Figure 15:
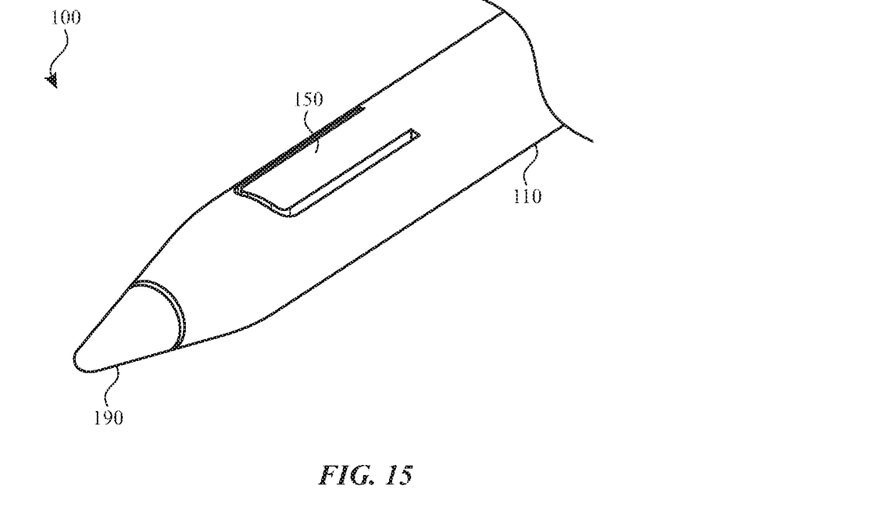
FIG. 15 illustrates a perspective view of a stylus, according to some embodiments of the present disclosure.
Figure 16:
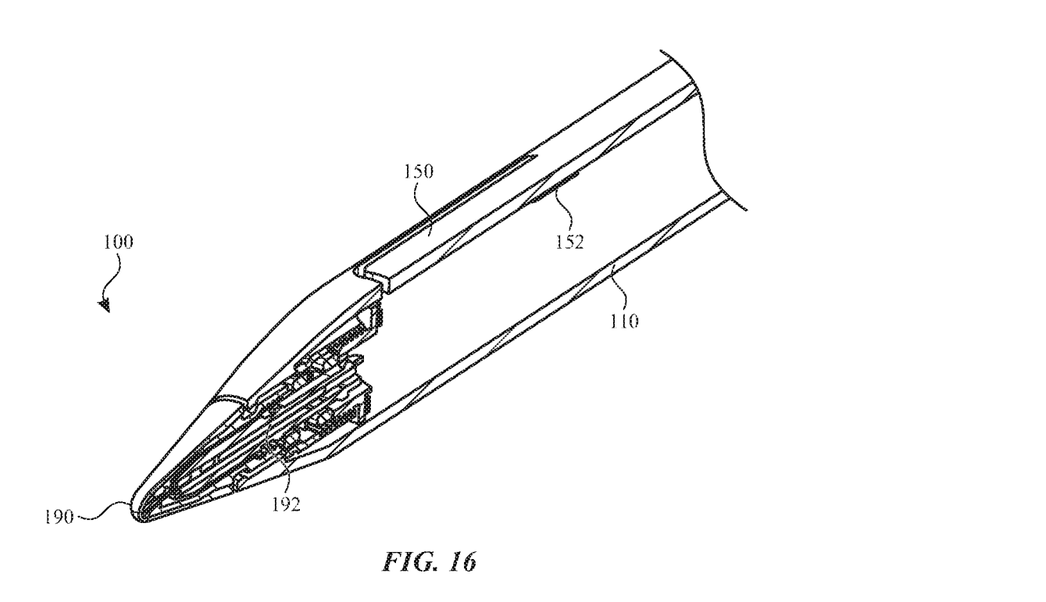
FIG. 16 illustrates a perspective sectional view of the stylus of FIG. 15, according to some embodiments of the present disclosure.

According to some embodiments, inputs can be received by a stylus 100 with or without the use of an adapter. As shown in FIGS. 15 and 16, the button 150 is provided at an outer surface of the body 110 of the stylus 100. The button 150 can extend from a portion of the body 110 and be moved with respect to the body 110 when pressed by a user. An input sensor 152 can be provided along at least a portion of the button 150 to sense movement of the button 150 based on user input. The input sensor 152 can generate a signal in response to deflection or movement of the button 150. For example, the input sensor 152 can include a strain gauge, a piezoelectric sensor, and/or a fiber Bragg sensor. The button 150 can be used as an input device independent of or in concert with a tip sensor 192.

Figure 17:
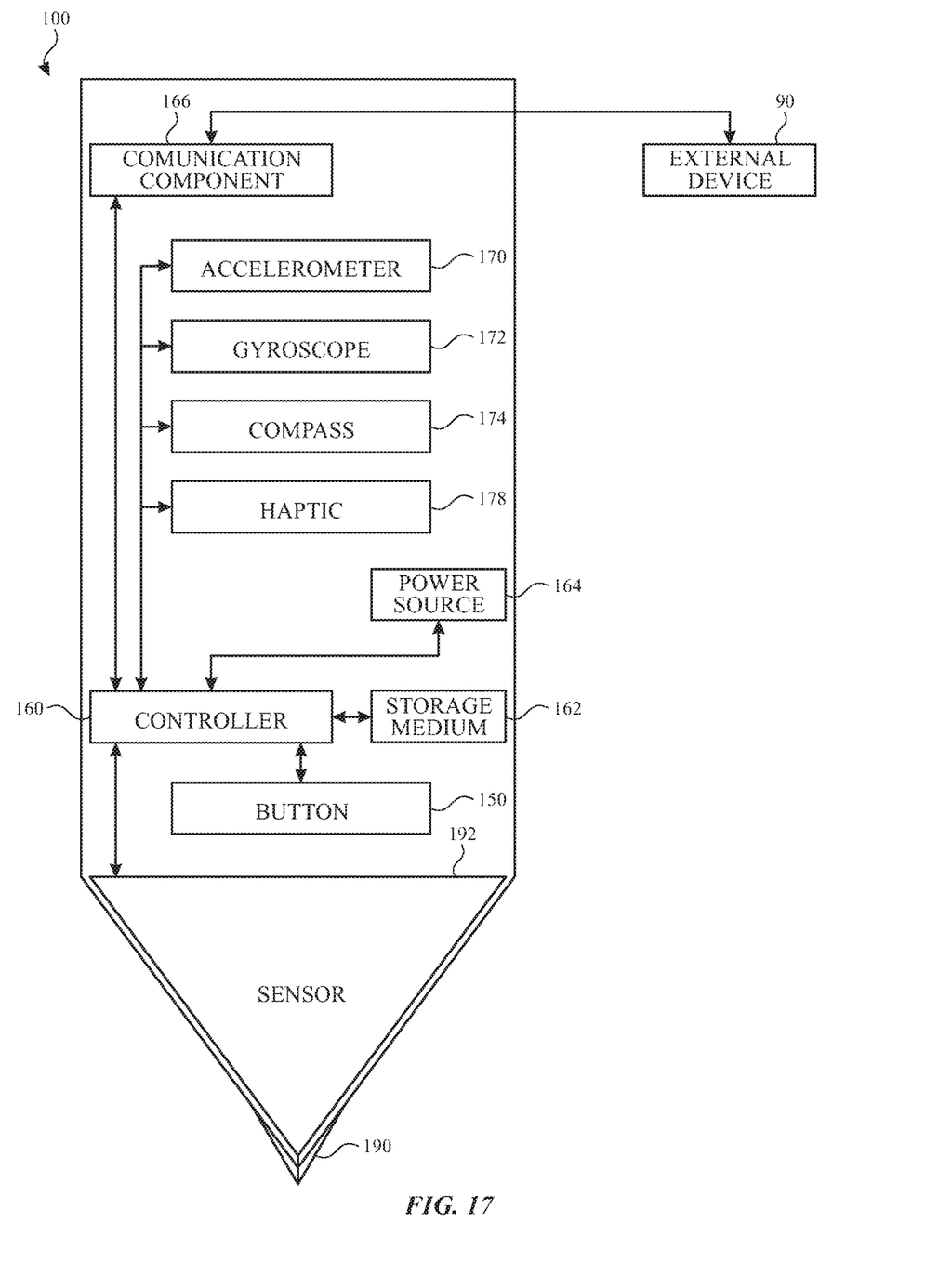
FIG. 17 illustrates a block diagram illustrating the stylus of FIG. 1, according to some embodiments of the present disclosure.

The stylus 100 can include various components to support the functions described herein. According to some embodiments, as shown in FIG. 17, the stylus 100 can include an accelerometer 170, a gyroscope 172, and/or a compass 174. During use, the accelerometer 170 can track and record acceleration of the stylus 100. Acceleration can be measured in a three-dimensional (x, y, and z) coordinate system. For example, the accelerometer 170 can have at least three components that each measure acceleration in one of three mutually orthogonal axes. By combining the measurements of all components, acceleration in the three-dimensional coordinate system can be determined. The accelerometer 170 can be configured to measure and record acceleration at several points in time during a sampling period. For example, the measurements can be taken at regular intervals of time. Other components of the stylus 100, such as the gyroscope 172 and/or the compass 174, can be used to measure acceleration of the stylus 100. The location of the tip probe 190 can be calculated based, at least in part, on the acceleration measurements, as discussed further herein. The stylus 100 can also include other components, such as a GPS receiver, that can be used to measure or calculate the position, velocity, and/or acceleration of the stylus 100.

According to some embodiments, the stylus 100 can include a controller 106 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 106 can execute one or more instructions stored in the non-transitory storage medium 162 to perform one or more functions.

According to some embodiments, the stylus 100 can include a communication component 166 for communicating with an external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

According to some embodiments, the stylus 100 can include a power source 164, such as one or more batteries and/or power management units. The stylus 100 can include components for charging the power source 164, such as the main body connector 112. Alternatively or in combination, the stylus 100 can include wireless charging capabilities for charging the power source 164. According to some embodiments, the stylus 100 can include components for converting mechanical energy into electrical energy. For example, the stylus 100 can include a piezoelectric device and/or a coil and magnetic components for generating electrical power upon mechanical movement thereof.

According to some embodiments, the stylus 100 can include other components including, for example, haptic devices, orientation detectors, biometric readers, displays, sensors, switches (e.g., dome switches), buttons, speakers, microphones, cameras, voice coils, and/or other components.

Figure 18:
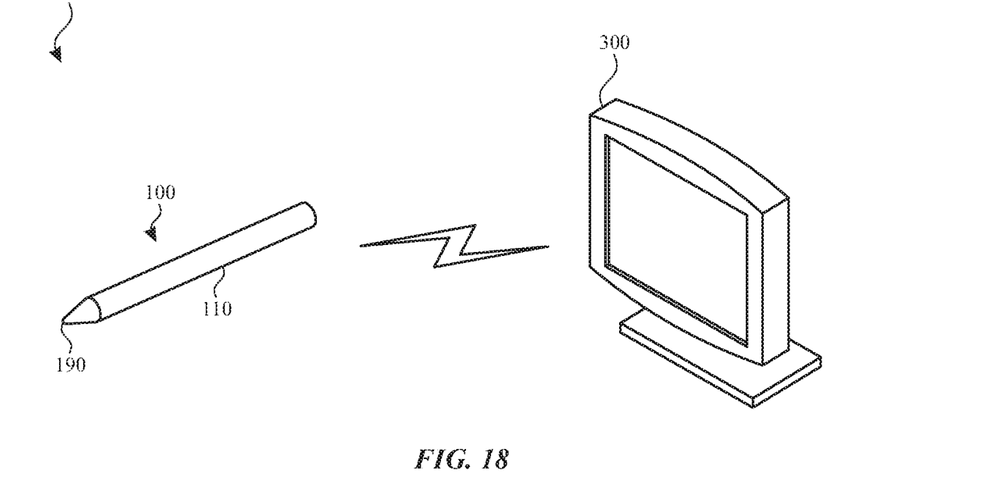
FIG. 18 illustrates a view of a system including a stylus and an external device, according to some embodiments of the present disclosure.

Inputs and motion can be detected by the stylus 100 and stored locally and/or transmitted to remote devices for use by others. FIG. 18 illustrates a system 1 in which the stylus 100 is in communication with the external device 300, according to some embodiments of the present disclosure. According to some embodiments, for example as illustrated in FIG. 18, the stylus 100 can detect gestures made by a user holding the stylus 100. When a gesture satisfies a predetermined threshold or other characteristic of gestures, the stylus 100 can transmit a signal to the external device 300 to perform one or more actions. According to some embodiments, a stylus 100 can be programmed to detect gestures only when a user is also providing a separate input, such as pressing the adapter 200 and/or the button 150.

Figure 19:
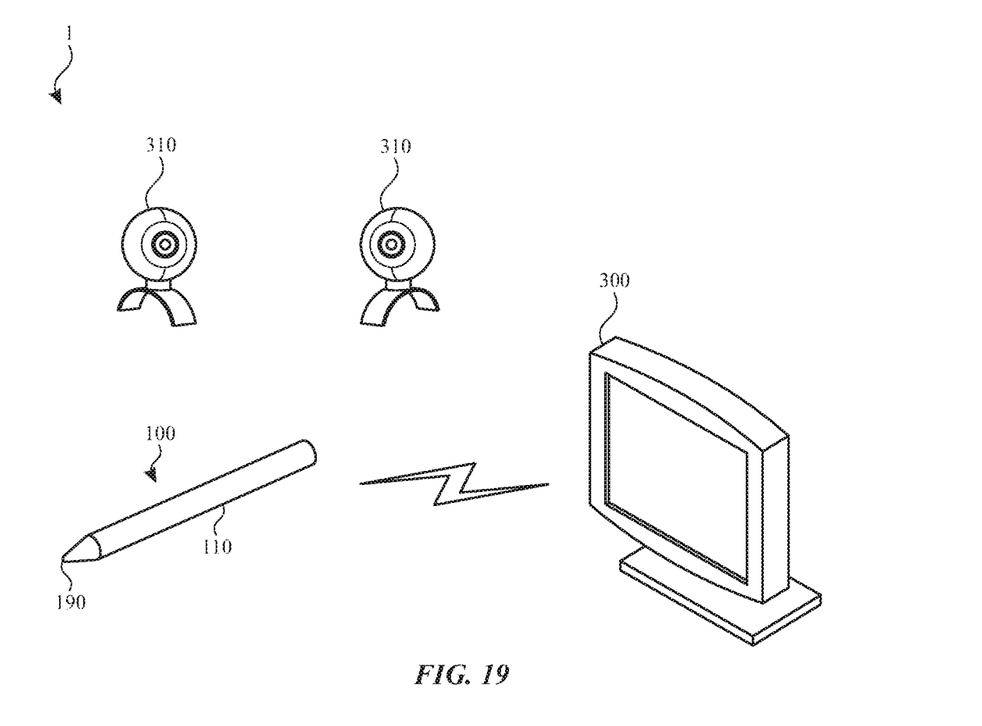
FIG. 19 illustrates a view of a system including a stylus, an external device, and tracking devices, according to some embodiments of the present disclosure.

FIG. 19 illustrates a system 1 in which the stylus 100 is observed by measurement devices 310, according to some embodiments of the present disclosure. According to some embodiments, for example as illustrated in FIG. 19, the stylus 100 can detect gestures made by a user holding the stylus 100. The measurement devices 310 can optically or otherwise observe the stylus 100 to determine its position in space relative to the measurement devices 310. The stylus 100 can include one or more features that allow the measurement devices 310 to interpret the position, distance, orientation, and/or movement of the stylus 100.

The stylus 100 can be used to virtually draw in three-dimensional space. Illustrations can be created in free space by motion of the stylus 100 by the user. One or more aspects of calibration and motion tracking as discussed herein for the stylus 100 can be applied to track free motion during a drawing session. The user can operate the adapter 200 and/or the button 150 to initiate a drawing session, in which a marking is virtually created starting at the location of the tip probe 190 in the coordinate system (e.g., in virtual space). As the user moves the stylus 100, the stylus provides outputs indicating its locations in virtual space during the session (e.g., when an input device is operated with a force). The locations in physical space can correspond to a physical location of the stylus 100 during the session. Markings continue to be generated along the pathway defined by the locations. When the user provides an indication (e.g., by releasing or pressing the adapter 200 and/or the button 150) to cease the drawing session, the marking ceases to be generated, and the user can move the stylus 100 without generating additional markings. The recording of markings can be performed independently of whether the tip probe 190 makes contact with a surface. According to some embodiments, the stylus 100 can record motions by the user during a drawing session and transmit the applicable data as an output for later usage. According to some embodiments, the stylus 100 can communicate with a device for visual display to the user, with which the markings are displayed for the user as they are generated during a drawing session. For example, the display can include a headset, a head-up display, and/or an optical head-mounted display in communication with the stylus 100 (e.g., directly or via an intervening device). By further example, the display can include a flat-panel display that displays a three-dimensional rendering of the markings. Similarly, the stylus 100 provides outputs indicating its locations in virtual space when the tip probe 190 is applied to surface. The locations can then correspond to a physical location of the stylus 100 while the tip probe 190 is applied to the surface.

The stylus 100 can be used in a real environment to influence a mixed reality system. For example, a device providing a visual display or other output to a user can apply inputs from the stylus 100 to a mixed reality system. The inputs can be applied to augmented reality system, an augmented virtuality system, and/or a virtual environment. By further example, the stylus 100 can be used to virtually mark and/or annotate items from a real environment and/or from a virtual environment. The markings and/or annotations can be recorded within the mixed reality system and output to a user.

During or between drawings sessions, the adapter 200 and/or the button 150 of the stylus 100 or another input device can be used to change how the markings are generated. While the stylus 100 is used for drawing or writing, the positions of the tip probe 190 can be recorded as markings, lines, or shapes having a variety of characteristics. For example, the recorded markings can have a certain shape, thickness, and color. When the user operates the adapter 200 and/or the button 150, the stylus 100 or another device can interpret the signal as a command to apply one or more characteristics to markings generated by subsequent input from the stylus. For example, a magnitude of a force applied to the adapter 200 and/or the button 150 can influence the generation of a corresponding signal to the magnitude of the force is applied to the marking. Accordingly, concurrent or subsequent markings can be recorded as having the one or more characteristics determined by the input signal.

The tip sensor 192 and the button 150 can be used in concert to provide commands and/or signals that are based on the inputs of both the adapter 200 and the button 150. For example, when the tip sensor 192 detects a signal (i.e., from contact with a surface or from the adapter 200), the button 150 can also be operated to create a combined input. The combined input can be recognized to generate a command and/or signal that corresponds to the application of both inputs.

According to some embodiments, a drawing session can be used to modify or edit a model generated based on operation of the stylus 100 with an object. For example, a user can draw a model, command the model to be rendered and displayed, and then further operate the stylus 100 to change aspects of the rendered and displayed model.

The stylus 100 can be used to receive inputs and map motions in three-dimensional space for use in various other applications. According to some embodiments, the motion of the stylus 100 by the user can be used by a gaming application that uses motion and forces from a user as inputs. According to some embodiments, the motion of the stylus 100 by the user can be used to detect user gestures that indicate user commands to an external device for performing a particular action. According to some embodiments, the inputs and motion of the stylus 100 by the user can be used to detect a selection by the user of an object that is displayed to the user in a virtual three-dimensional environment.

As discussed above with respect to coordinate measuring, all of the components for tracking motion of the stylus 100 during a drawing session can be entirely contained within the stylus 100. Neither mechanical attachment to external measuring equipment nor communication with external devices is required to track the motion of the stylus 100 in space. As such, the stylus 100 can be hand-held, wireless, and freely moveable by the user during a drawing session.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stylus comprising:
   a body;
   a tip probe for contacting a surface;
   a tip sensor configured to detect a first force when the tip probe is applied to a surface; and
   an adapter configured to move relative to the body and exert a second force, different than the first force, on the tip probe, wherein the tip sensor is configured to detect the second force.

2. The stylus of claim 1, wherein the adapter comprises:
   a first end portion;
   a second end portion connected to the tip probe; and
   a fulcrum between the first end portion and the second end portion, the fulcrum being configured to contact the body, wherein the adapter is configured to pivot about the fulcrum to exert the second force on the tip probe.

3. The stylus of claim 2, wherein the first end portion comprises:
   an outer surface facing away from the body; and
   a protrusion on the outer surface and extending away from the body.

4. The stylus of claim 1, wherein the adapter is fixedly attached to the tip probe.

5. The stylus of claim 1, wherein the adapter is coupled to the tip probe and moveable against the body.

6. The stylus of claim 1, wherein the adapter is coupled to the body and moveable against the tip probe.

7. The stylus of claim 1, wherein the adapter comprises:
a first lever rotatable about a first pivot that is fixed relative to the body; and
a second lever rotatable about a second pivot that is fixed relative to the body, wherein the second lever is connected to the first lever and the tip probe, wherein the second lever is configured to apply the second force to the tip probe when the first lever is rotated about the first pivot.

8. The stylus of claim 7, wherein the adapter further comprises:
a third pivot joining the first lever and the second lever; and
a fourth pivot joining the second lever and the tip probe.

9. The stylus of claim 1, wherein the adapter is configured to convert an input force, applied to the adapter, into the second force to urge the tip probe away from the body, wherein a direction of the input force is different than a direction of the second force.

10. The stylus of claim 9, wherein at least a component of the first force is in a first direction along a longitudinal axis of the body, and at least a component of the second force is in a second direction along the longitudinal axis and opposite the first direction.

11. A stylus comprising:
a tip probe;
a tip sensor configured to detect a first force when the tip probe is applied to a surface, wherein the stylus is programmed to provide a first output indicating a first location in virtual space corresponding to a physical location of the stylus while the tip probe is applied to the surface; and
an input device configured to receive a second force without applying the tip probe to any surface, wherein the stylus is programmed to provide a second output indicating a second location in virtual space corresponding to a physical location of the stylus while the second force is received, wherein the input device is an adapter configured to convert the second force to a third force applied to the tip probe.

12. The stylus of claim 11, wherein the first output and the second output are detectable by an external device configured to record the first location and the second location.

13. The stylus of claim 11, wherein the third force includes a component in a direction along a longitudinal axis of the stylus and opposite a direction of the first force.

14. An adapter for use with a stylus, the adapter comprising:
a first end portion for receiving an input force from a user;
a second end portion for providing an output force to a tip probe of the stylus, the tip probe being connected to a tip sensor configured to detect the output force; and
a fulcrum that, when the input force is applied to the first end portion, is configured to engage a body of the stylus, facilitate movement of the adapter relative to the body, and convert the input force from the user into the output force to the tip probe.

15. The adapter of claim 14, wherein the second end portion is configured to securely engage the tip probe of the stylus.

16. The adapter of claim 14, wherein the first end portion is configured to securely engage the body of the stylus.

17. The adapter of claim 14, wherein the fulcrum positioned is between the first end portion and the second end portion.

18. The adapter of claim 14, wherein the fulcrum, when the input force is applied to the first end portion, is configured to convert the input force into the output force to be in a direction that is away from the body of the stylus.

* * * * *